United States Patent [19]

Allweier et al.

[11] Patent Number: 4,655,071
[45] Date of Patent: Apr. 7, 1987

[54] TRANSFER PRESS WITH QUICK CHANGE DIE SET ARRANGEMENT

[75] Inventors: Werner K. Allweier, Huntington; David W. Knight, Stratford, both of Conn.

[73] Assignee: The U.S. Baird Corporation, Stratford, Conn.

[21] Appl. No.: 801,927

[22] Filed: Nov. 26, 1985

[51] Int. Cl.⁴ .................. B21D 45/04; B21D 45/08
[52] U.S. Cl. ................................. 72/346; 72/345; 72/427
[58] Field of Search ............. 72/405, 427, 344–346, 72/446, 448, 456, 328

[56] References Cited

U.S. PATENT DOCUMENTS

| | | | |
|---|---|---|---|
| 402,668 | 5/1889 | Hart | 72/345 |
| 3,171,144 | 3/1965 | Maistros | 72/427 |
| 3,280,613 | 10/1966 | Schrom | 72/344 |
| 4,166,372 | 9/1979 | Knight | 72/348 |
| 4,257,253 | 3/1981 | Zanzeri | 72/427 |
| 4,283,932 | 8/1981 | Putetti | 72/345 |
| 4,395,899 | 8/1983 | Wisebaker | 72/427 |
| 4,406,148 | 9/1983 | Knight | 72/405 |
| 4,498,384 | 2/1985 | Murphy | 72/448 |

OTHER PUBLICATIONS

Transfer Press Tooling Manual, U.S. Baird Corporation, Stratford, Connecticut, 1965, pp. 1–49.

Primary Examiner—Daniel C. Crane
Attorney, Agent, or Firm—Armand Cifelli; K. B. Adolphson

[57] ABSTRACT

A metal forming press having a reciprocating ram and a transfer mechanism for transferring workpieces sequentially between a multiplicity of work stations located on a multi-post die set has a quick change die set arrangement enabling the press to be utilized in a "just-in-time" manufacturing system. The knockout and stripper mechanism of the press are designed to eliminate the need for disassembly of the same during removal and replacement of die sets.

40 Claims, 13 Drawing Figures

TRANSFER PRESS WITH QUICK CHANGE DIE SET ARRANGEMENT

BACKGROUND OF THE INVENTION

The invention relates generally to multi-station strip metal forming presses, and more particularly to multi-station strip metal formal presses having vertically reciprocal rams and removable die sets.

Multi-station strip metal forming machines have been manufactured by The U.S. Baird Corporation, Stratford, Conn., under the trademark MULTIPLE TRANSFER ®, for many years. In these machines, coil strip stock is fed in widths from a fraction of an inch through up to seven inches on larger machines. Blanks are automatically cut from the strip, and vertical blank transfer mechanism positively holds and carries the blank down to the transfer level, where it is picked up by the transfer fingers of a horizontal transfer mechanism. Usually the blank is transferred through a succession of draw dies in as many as fifteen (15) individual work stations and, finally, ejected as a completed part. This type of completely automatic operation allows piercing, forming, drawing, lettering, embossing and flanging, as well as side slotting, side piercing and reverse drawing at production rates which have exceeded two hundred fifty (250) parts per minute.

In the past, The U.S. Baird Corporation has made standardized, highly precise die sets for mounting the tooling in their machine. Complete die sets can be interchanged without losing the tool adjustment thereby facilitating set up and minimizing down time. These die sets without the tooling are relatively expensive compared to conventional commercially available die sets; on the order of twenty to one.

With the advent of the concept of "just-in-time" manufacturing, parts suppliers, who are users of the MULTIPLE TRANSFER ® presses, are now required to supply component parts to final assembly operations in small quantities just as the parts are ready to be assembled into the finished product. Such a system permits the final assembly organization to maintain a small or even no inventory of component parts thereby dramatically cutting its costs but increasing the burden on component manufacturers in that their production machines must be constantly producing small quantities of different components. To meet such a manufacturing strategy, the parts suppliers using MULTIPLE TRANSFER ® presses must purchase several die sets which can be interchanged to minimize the down time of their machines. However, because of the high initial cost of these die sets, it becomes prohibitively expensive to have a large number of extra die sets on hand. Furthermore, the existing MULTIPLE TRANSFER ®presses are not adapted to facilitate rapid and convenient changeover from one die set to the next.

The present invention is designed to overcome the above-noted limitations, and toward this end, it contemplates the provision of a novel multi-station strip forming press which is adapted to utilize commercially available, relatively inexpensive two or four-post die sets.

It is also an object to provide such a press in which the die sets can be quickly and easily interchanged to meet the needs of the "just-in-time" concept of manufacturing.

Still another object is to provide such a press which has knockout and stripper mechanisms accommodating the interchangeability of the die sets.

A further object is to provide such a press which may be readily and economically fabricated and will enjoy a long life in operation.

SUMMARY OF THE INVENTION

It has now been found that the foregoing and related objects can be readily attained in a multi-station metal forming press including a press frame having a press bed with a substantially planar, horizontally orientated die set supporting surface and a vertical slot. Above the press bed, a single ram is mounted on the frame for vertical reciprocation by a power drive. A multi-post die set, having a punch block secured to the ram and a die block secured to the press bed in a face-to-face relationship with the die set supporting surface, includes a multiplicity of apertures spaced along its longitudinal axis aligned with the slot of the press bed. Each of the apertures having an intermediate knockout pin located therein.

Aligned with selected ones of the die block apertures are centrally located work forming openings in a multiplicity of metal forming dies mounted on the die block. Each of the openings have a knockout plunger located therein. A multiplicity of metal forming punching tools are mounted on the punch block and correspond in number to the number of metal forming dies. Each of the punching tools are aligned with and configured to enter into the centrally located work forming opening of its associated die. The associated pairs of dies and punches form work stations spaced longitudinally within the die set. A transfer mechanism for carrying a workpiece sequentially in a predetermined manner to each of the work stations is also provided.

According to the invention, a knockout mechanism for providing positive upward movement to workpieces includes a plurality of knockout rods mounted for longitudinal movement within the slot of the press bed. Springs bias the knockout rods to a position where their upper ends are normally flush with the horizontal surface of the die bed and in operative engagement with its associated intermediate knockout pin. A cam and follower arrangement for engaging the lower ends of the knockout rods provide a periodic positive upward force on the same within the slot.

Still another feature is a stripper mechanism having a stripper sleeve surrounding selected ones of the punching tools and a plurality of spring biased stripper levers corresponding in number to the number of the stripper sleeves and operatively engaged therewith. The stripper levers being supported for pivotal movement adjacent the die set on a pair of spaced apart removable brackets supporting a pivot rod therebetween and on half bearings to facilitate removal of the stripper levers as the die set is being replaced in press frame. A stripper relief mechanism having a pair of relief levers supporting a removable bar carrying a plurality of adjustable contact elements is adapted to operatively engage the stripper levers. The relief mechanism moves in a timed relationship to the operation of the ram whereby it permits upward movement of the stripper sleeves to allow workpiece transfer by the transfer mechanism.

A further feature is a locking device associated with and for holding each of the intermediate knockout pins in their apertures and preventing relative movement between the intermediate knockout pins and the die set when the die set is removed from the frame. The locking device includes plurality friction devices with spring biased friction pins and adjustment screws.

Ideally, an auxiliary support system, hingedly secured to the press bed and adjacent the die set supporting surface, is included to support the die set when it is being removed from and installed in the press. To facilitate the removal of the die set, a plurality of T-shaped bars are attached on upper and lower surfaces thereof by fasteners surrounded by biasing springs and extending through the punch and die blocks. These bars mate with T-shaped slots in the press bed and ram. Pneumatically actuated roller devices are mounted in the press bed to elevate the die sets during the removal and installation operations.

This novel combination of elements permits easy and convenient removal and replacement of the die sets whereby the press can be used in the "just-in-time" manufacturing process.

Our invention will be fully understood when reference is made to the following detailed description taken in conjunction with the accompanying drawings.

DETAILED DESCRIPTION OF THE PREFERRED EMBODIMENT

Figure 1:
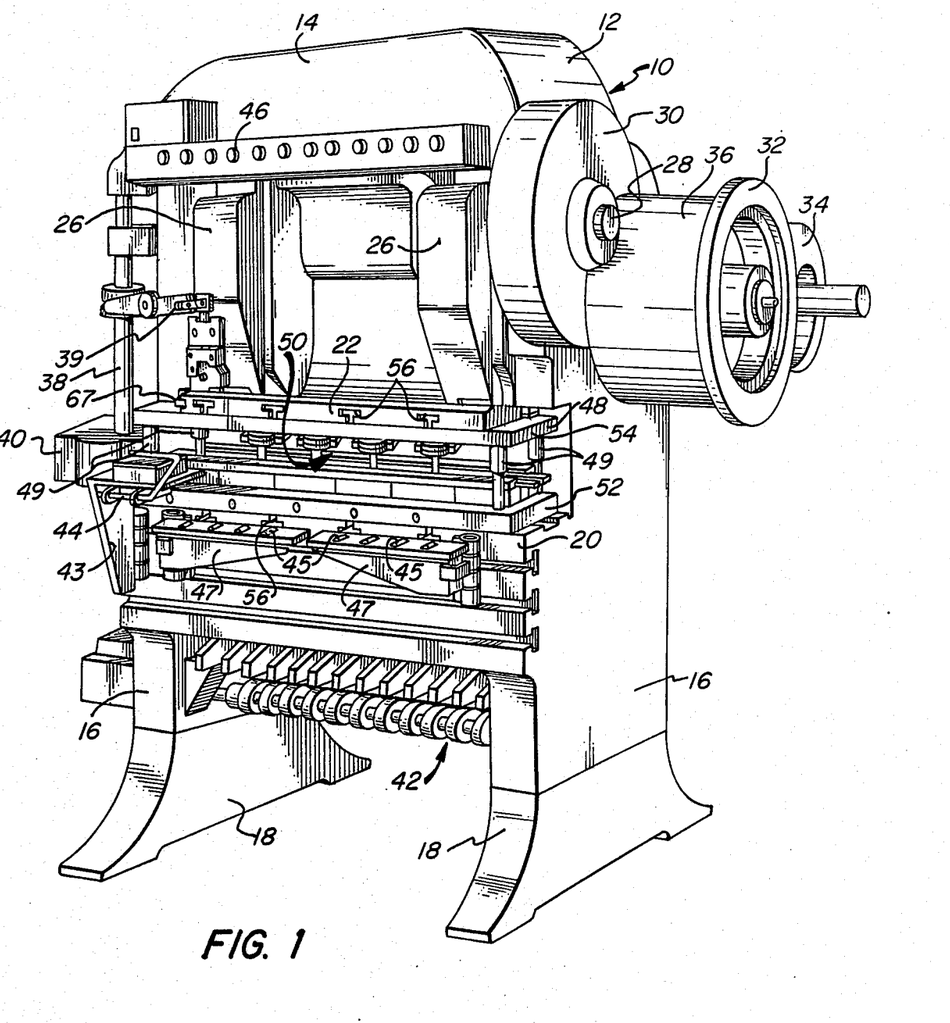
FIG. 1 is a front perspective view of a multi-station strip metal forming transfer press embodying the present invention.

Turning first to FIG. 1 of the drawing, therein illustrated is a transfer press generally indicated by the numeral 10 and incorporating the present invention. The press comprises a frame 12 which includes at its top a generally horizontally extending crown 14 supported by a pair of side walls 16 which extend vertically and at their lower ends are formed with mounting feet 18. The side walls of 16 of the press 10 are considerably different from the existing U.S. Baird machines in that tie rods, which normally increase rigidity and strength of the machines and which would interfere with the easy removal of die sets, are eliminated and the width of the side walls 16 is increased to maintain the desired strength and rigidity. Spaced upwardly from the feet 18 of the press is a solid press bed 20 that extends horizontally between and is supported by the walls 16. Mounted for predetermined controlled vertical reciprocation below the crown 14 and between walls 16 is a ram 22. The ram 22 is mounted for sliding movement in appropriately provided guideways 24 (see FIG. 4) located in the frame for controlled vertical reciprocation and is operatively associated with the press bed 20 to effect work on work pieces.

The ram 22 is vertically reciprocated by known ram cam and roller mechanism (not shown) that is mounted within the housings 26. The ram cams are mounted on a horizontally extending cam shaft 28. The drive for the cam shaft 28 comprises a bull gear (not shown) which is mounted within the guard 30, a fly wheel 32 and a motor 34 which is the main source of power for operating the press 10. The power drive includes an air clutch-brake (not shown) mounted within the guard 36, of known construction.

Figure 10:
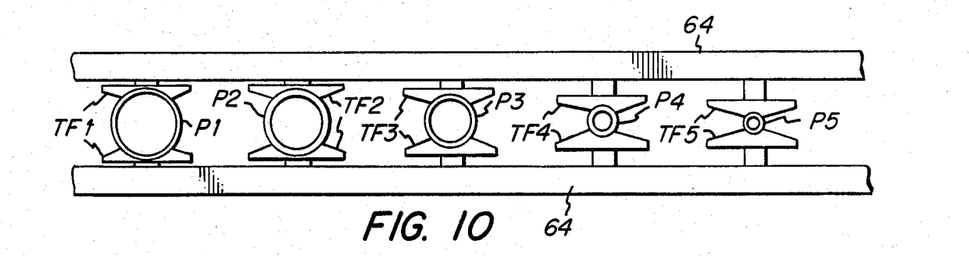
FIG. 10 is a fragmentary plan view of the transfer mechanism of the press showing parts being gripped by the transfer fingers at the sequential stations of the press.

The press includes a vertically extending side shaft 38 for driving various subassemblies such as the metal strip feed (not shown), vertical blank transfer mechanism 39 and a horizontally reciprocable workpiece transfer mechanism (FIG. 10). Shaft 38 is driven at its upper end through a bevel gear arrangement (not shown) by the cam shaft 28. At its lower end the side shaft 38 drives the horizontally reciprocable workpiece transfer mechanism, of known construction, which is at least partially disposed within the housing 40. The construction and operation of the side shaft, its beveled drive connection with the cam shaft and its driving connection with the various subassemblies are all known.

The press 10 includes knockout mechanisms generally indicated by numeral 42, lubricating device 44 mounted on a hinged bracket 43, all modified in accordance with the invention as explained in greater detail hereinafter. The press includes an appropriate metal strip feeder mechanism (not shown) and may include additional features, such as a cross motion attachment and other attachments or accessories, all known in the art. The press is controlled by an appropriate array of pushbuttons on a panel 46. Hingedly mounted on the front vertical face of the press bed 20 are a pair of spaced auxiliary die set supports 47 shown in their inoperative position in FIG. 1. Each of the auxiliary die set supports 47 has four rollers 45 spaced along the upper surface thereof.

Figure 5:
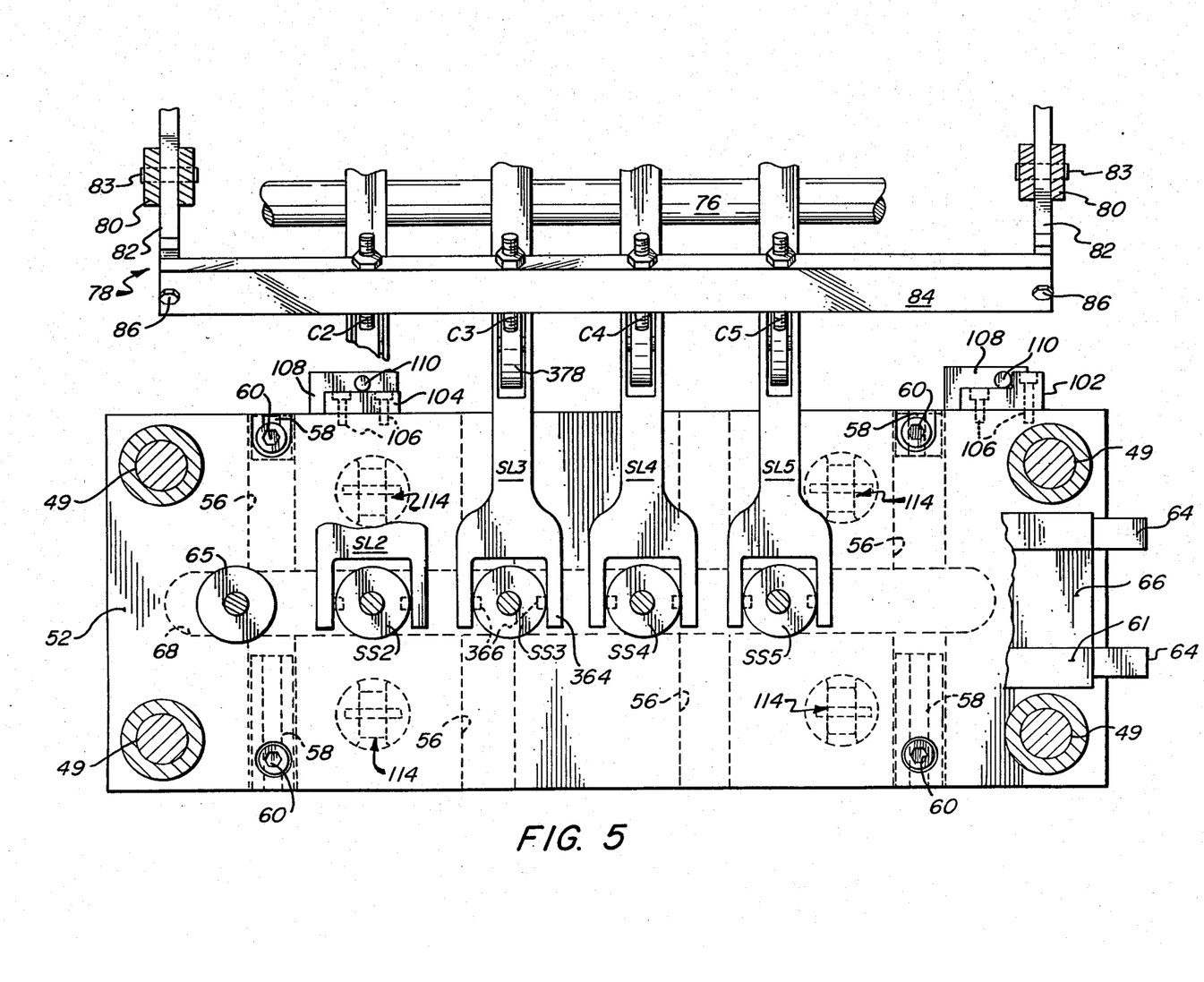
FIG. 5 is a fragmentary horizontal sectional view taken essentially along the 5—5 line of FIG. 4 with some components removed and broken away for clarity of illustration.
Figure 12:
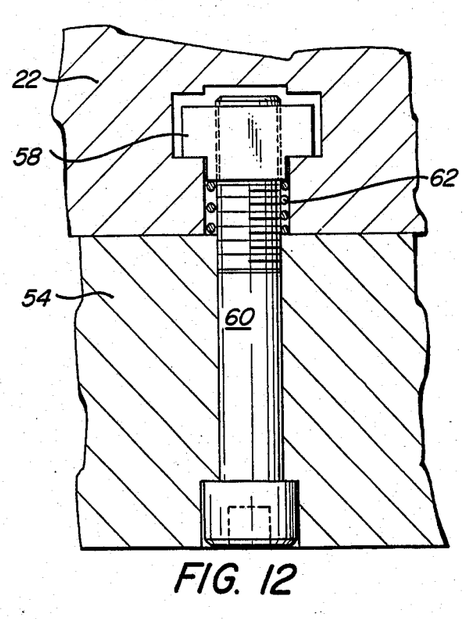
FIGS. 12 and 13 are enlarged fragmentary sectional views of one of the T-shaped bars and its corresponding mounting means in its retained and released positions, respectively.

A conventional, commercially available, self-contained, interchangeable die set 48, which has four guide post-sleeve combinations 49 and carries the tooling generally indicated by the numeral 50 for producing shaped parts from strip metal, has been modified in accordance with the present invention and is mounted in the press with its die block portion 52 secured to the bed 20 and its punch block 54 being secured to the ram 22. The interconnections between the die set 48, the press bed 20 and the ram 22 are achieved by a series of T-slots 56 machined in the horizontal planar surfaces of the press bed 20 and ram 23 mating with T-shaped bars 58 (FIG. 12). As best seen in FIG. 12, each of the T-shaped bars 58 (only one shown in ram 22 for purposes of illustration) are connected to the die set 48 by a pair of securing machine bolts 60 (only one shown) which can be accessed through the interior of the die set 48. Interposed between the die set 48 and each of the T-shaped bars 58 and surrounding each of the securing screws 60 is a compression spring 62. The T-shaped bars 58 vary in size at different points in the press 10. Those located in the ram 22 extend entirely thereacross whereas those located in the bed 20 are much shorter, as shown in FIG. 5.

Figure 11:
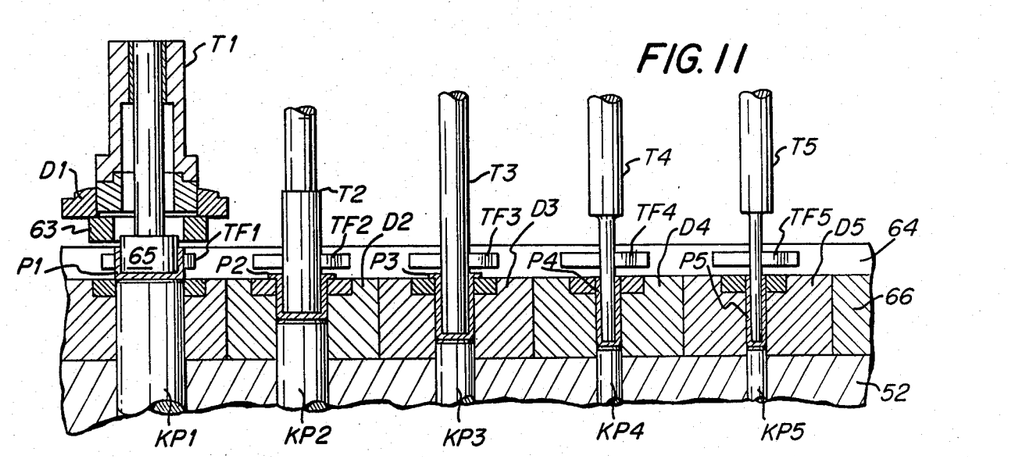
FIG. 11 is a fragmentary vertical sectional view taken through the tooling of the press when the press is in its closed position performing work on workpieces.

The general operation of the press 10 of FIG. 1 should be understood by those skilled in the art; a blank, and the part P thereafter formed out of the blank (see FIGS. 10 and 11) sequentially index through the machine, i.e., moves one station at a time in a predetermined controlled timed manner. When in full operation, the press has a workpiece at each station which constitutes a part that has been formed up to the point of forming to that station, and that additional work is performed on the part at each station. The transfer of the work piece is effected by a transfer mechanism of known construction and operation in the art, which is partially illustrated in FIG. 10. It comprises a pair of spaced transfer rails 64 that extend horizontally between a rail retainer 61 (See FIGS. 4 and 5), and support on their opposing sides inwardly biased spring pressed transfer fingers TF1-5. The arrangement is such that the transfer rails 64 and an associated transfer slide (not shown) jointly reciprocate horizontally in timed relation with the vertical operation of punching tools T1-T5 and knockout plungers KP1-KP5 to the functional end result of transferring a workpiece one station at a time, i.e., moving a work station for having work performed thereat, and after the work has been performed, moving the work piece to the next station until the part is finished. In FIG. 10 and FIG. 11, the same part is shown at stations 1, 2, 3, 4 and 5 as it progresses through the press. The same numerical suffix designations for the stations at which the part and components are located are provided in FIGS. 10 and 11. In FIG. 11, a part P is shown as it is formed at a given station, and in FIG. 10, the transfer mechanism at the same station is shown gripping the part in such form and poised to transfer to it the next station. It should be understood that five work stations are shown for illustrative purposes only and depending on the type and size of the machine, up to fifteen (15) stations can be used for a wide variety of functions to produce precision stamped and drawn parts.

Figure 8:
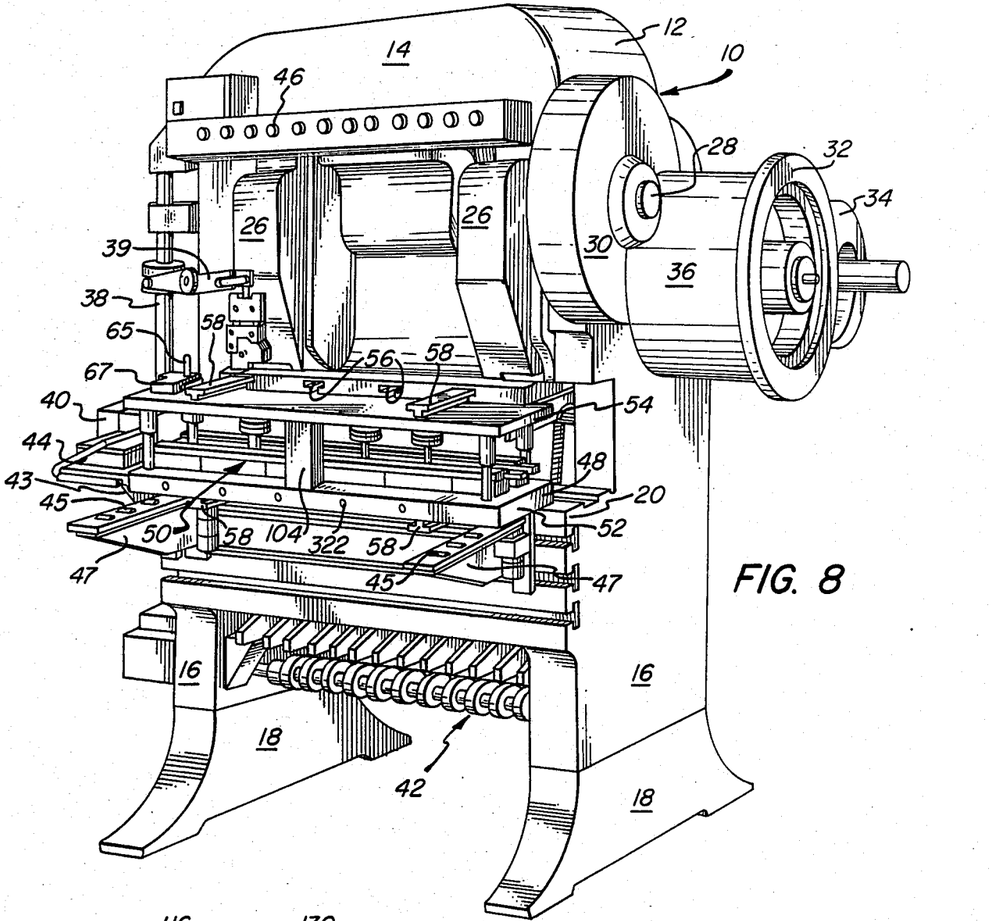
FIG. 8 is a front perspective view of the press of FIG. 1 with the die set partially removed therefrom.

The normal operation of a transfer press of the type involved as it pertains to tools that are fixed relative to the ram 22, such as tools T1, T2, T3, T4 and T5, is known, but will be briefly described. The ram is caused to reciprocate vertically in predetermined timed relationship by the ram cam and roller mechanism (not shown) driven by the main shaft 28 which, in turn, is driven by the motor 34 through the clutch mechanism (not shown). The tools move vertically with the ram 22 and punch block 54 relative to the die block 52 an amount limited by the configuration of the ram cam and roller mechanism and the size of the press. Periodically the fixed tools are downwardly moved into associated dies, D1, D2, D3, D4 and D5 mounted in a die block holder 66 at the respective stations 1, 2, 3, 4 and 5. The blank which has been blanked out of a strip (not shown) fed to the first station of the press is worked as it is transferred downwardly through cupping die 63 by cup punch 65. The cup punch 65 extends upwardly through the punch block 54 and an L-shaped block 67 (FIGS. 1 and 8) mounted on the punch block 54 and releasably connected to the ram 22. The cup punch 65 is releasably connected to operating mechanism 39 (FIG. 1) in a known manner. The knockout plunger KP1 provides a positive upward force against part P1 and the downward movement of the cup punch 65 until part P1 is sequentially indexed by the transfer mechanism to the succeeding station, where additional work is performed on the part.

Figure 2:
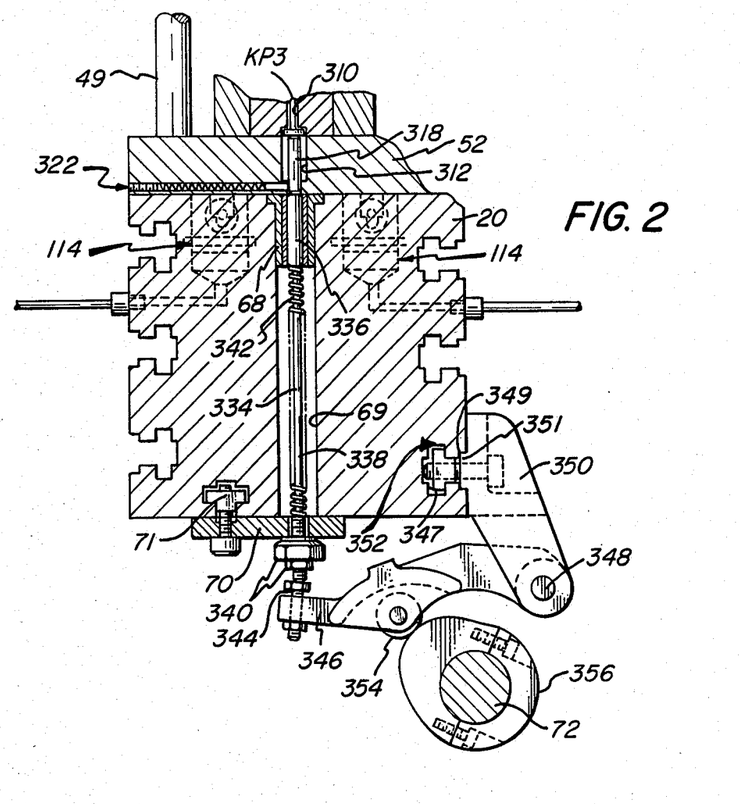
FIG. 2 is an enlarged fragmentary vertical sectional view of the FIG. 1 press taken substantially through work station 3 and showing the lower knockout mechanism thereof.
Figure 3:
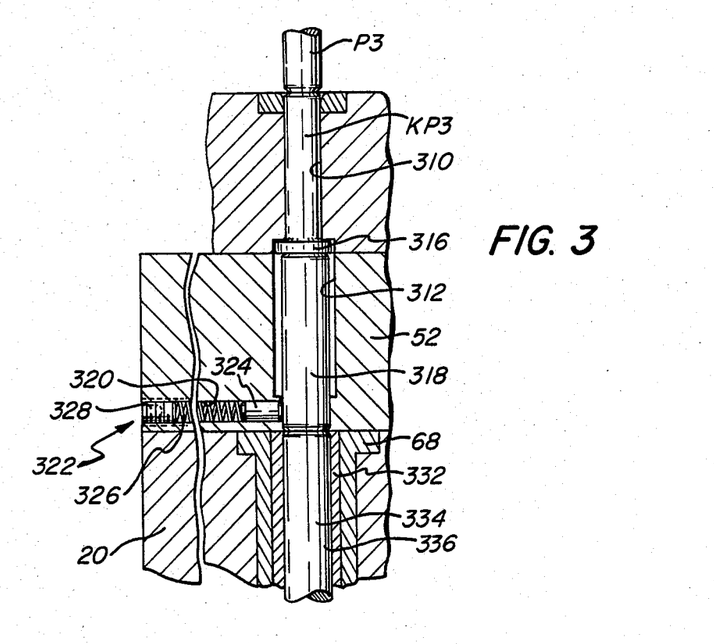
FIG. 3 is a view similar to FIG. 2 on an enlarged scale showing details of the knockout device.

In order to provide for the positive vertical upward movement of a part out of the dies up to the level of the transfer rails 64 after it has been worked upon at any given station, lower knockout arrangements, having knockout plungers KP2-KP5, modified in accordance with the present invention are provided. Turning now to FIGS. 2 and 3, the individual knockout arrangement at station 3 is shown in detail in its upper, part discharging position to provide positive removal of the part P3 from its die D3 thereby preventing the part P3 from being jammed in the die D3 after work has been done on the part. It should be understood that a similar knockout arrangement is provided at each of the stations 1-5 and, therefore, a description of the knockout arrangement at station 3 will suffice for all of the individual knockout arrangements. Either a letter designation in combination with the numeral 3 or a 300-series numeral will be used to hereinafter designate component structures found at station 3. As would be apparent to those skilled in the art, equivalent knockout components would be found at each of the individual stations 1-5

Die D3, having a centrally located work forming opening 310, is mounted in die block holder 66. This combination is in turn mounted on the die block 52 with the centrally located opening 310 of the die D3 aligned with a die block aperture 312 formed in the die block 52.

Slideably mounted in the centrally located opening 310 is the knockout plunger KP3 with its enlarged head portion 316 seated in an enlarged counterbore portion of the opening 310. Directly below and operatively engaged with the enlarged head portion 316 of the plunger KP3 is an intermediate knockout pin 318 slideably received in the lower, small diameter portion of the die block aperture 312. Formed in the die block 52 at an angle approximately normal to the die block aperture 312 is a friction lock aperture 320 in which is positioned a friction lock generally indicated by the numeral 322. The friction lock 322 includes a friction pin 324 biased into operative engagement with the knockout pin 318 by a compression spring 326 inserted between the friction pin 324 and an adjustable screw 328 threadably received in the press bed 20.

Secured in a vertical elongated slot 69 in the press bed 20 with its upper surface flush with the horizontal surface of the press bed 20 is a knockout guide block 68 having an internal bearing sleeve 332 press fit therein. A knockout rod 334 has an enlarged bearing portion 336 slideably mounted within the bearing sleeve 332. Below the enlarged bearing portion 336, the knockout rod 334 has an elongated portion 338 that extends downwardly in the vertical slot 69 through a knockout spring plate 70 secured to the press bed by a conventional T-slot mounting mechanism 71. The lower end of the knockout rod 334 is threaded and has adjustment nuts 340 adjustably secured thereon. Surrounding the knockout rod 334 and operatively engaged with both the knockout spring plate 70 and the enlarged bearing portion 336 of knockout rod 334 is a coil knockout spring 342 which biases the knockout rod 334 upwardly into a position whereby its upper surface is substantially flush with the horizontal surface of the press bed 20. This flush relationship of the knockout rod 334 relative to the press bed 20 can be maintained by use of the adjustment nuts 340 on the threaded end of the knockout rod 334.

The knockout arrangement is such as to bias the knockout rod 334 upwardly at all times thereby providing positive upward movement to the workpiece. The lower end of the elongated portion 338 of the knockout rod 334 is formed so as to be engaged periodically by an adjustable screw-like drive member 344 to move it upwardly in a positive predetermined manner. This is effected by periodic movement of a knockout lever 346, which is pivoted at its end on a pin 348 mounted in knockout bracket 350 that is secured to the lower back side of the bed 20 by a specially designed T-slot mounting mechanism generally designated 352. The T-slot 347 is provided with keyway 349 at outer portion thereof. A key 351 on the bracket 350 is seated in the keyway 349. This permits the knockout bracket 350 to be accurately located and held in place by the single T-slot mounting mechanism 352. The mounting mechanism 352 facilitates repositioning of the knockout arrangement by loosening it and sliding the mechanism along the T-slot. The knockout lever 346 carries a cam follower 354 which is operated by the knockout cam 356 driven by a lower horizontally extending drive shaft 72.

Figure 4:
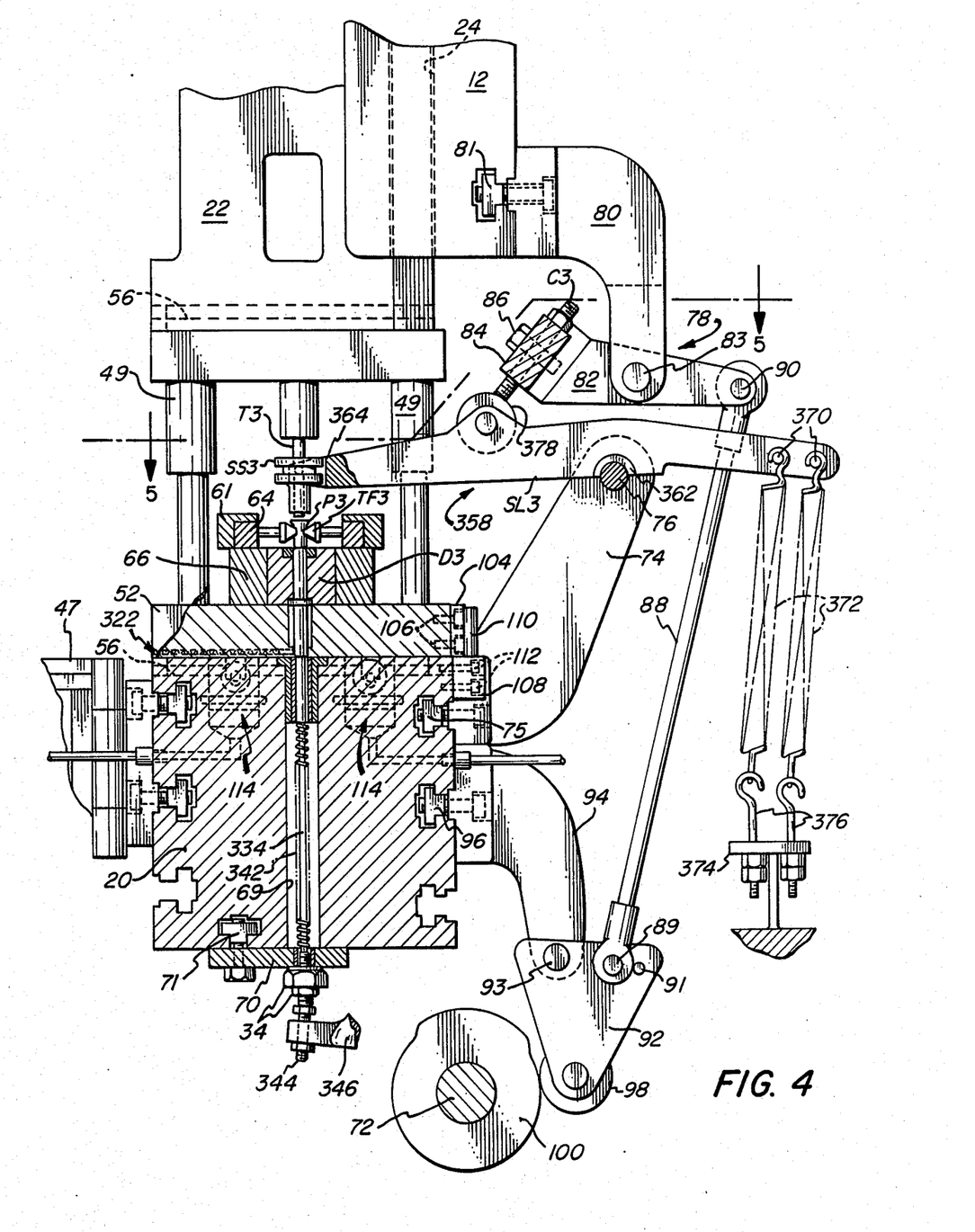
FIG. 4 is a view similar to FIG. 2 with some parts in full line and other parts broken away for purposes of illustration and showing details of the stripper mechanism of work station 3.

Referring now to FIG. 4, therein illustrated is the stripper mechanism for work station 3 generally indicated by the numeral 358. It should be understood and it is partially illustrated in FIG. 5 that work stations 2, 4 and 5 are each provided with a stripper arrangement similar to that illustrated at work station 3. Therefore, a description of the individual stripper mechanism at work station 3 will suffice for all the individual stripper mechanisms. A letter designation in combination with the numeral 3 or a 300-series designation will continue to be used for portions of work station 3, but it should be understood that equivalent stripper components are included at each of the individual stations 2-5. As recognized by those skilled in the art, work station 1, being a blanking and drawing station, does not necessitate a stripper mechanism.

A pair of stripper lever brackets 74 (only one shown) are secured to the rear side of the press bed 20 in a spaced apart relationship by appropriate T-slot attaching mechanisms 75 (only one shown) similar to mounting mechanism 352. Extending between the brackets 74 is a pivot rod 76 which provides pivotable support for an elongated stripper lever SL3. The stripper lever SL3 is pivotally and removably mounted on the pivot rod 76 by means of a half bearing 362 and has a bifurcated end portion or stripper fork 364 including converging drive keys 366 (see FIGS. 5-7) cooperating with a groove in the upper end of a stripper sleeve SS3 surrounding punching tool T3. At the other end of the stripper lever SL3 are a pair of spring tension pins 370 which are operatively engaged by a pair of tension springs 372 secured at their lower ends to a spring bracket 374 by adjustable spring hooks 376. The tension springs 372 provide a positive upward force on the stripper sleeve SS3 through the stripper lever SL3.

Counteracting the upward force on lever SL3 produced by the tension springs 372 is a punch stripping and stripper relief mechanism generally indicated by the numeral 78 which engages a roller 378 on the upper side of the stripper lever 360 through an adjustable contact screw C3. The punch stripping and stripper relief mechanism 78 includes a pair of relief lever support brackets 80 (only one shown) secured to the frame 12 in a spaced apart relationship by T-slot mounting mechanisms 81 (only one shown) similar to mounting mechanism 352. Each of the brackets 80 has a bifurcated free end having a relief lever 82 attached thereto by a clevis pin 83 so as to form a pivotal connection therebetween. Disposed between the relief levers 82 is a removable bar 84 secured thereto by retaining bolts 86. The bar 84 supports the adjustable contact screws C2-C5 for each of the stations 2-5. At the other end of each of the relief levers 82 is an actuating or push rod 88 pivotally secured thereto by a pivot pin 90. The rod 88 extends downwardly to a triangular-shaped lever 92 where it is pivotally received at one corner thereof on pin 89. The push rod 88 can also be connected to pin 91 if further leverage is desired. The triangular-shaped lever 92 is pivotally connected at 93 to a bracket 94 which is rigidly secured to the rear of the press bed 20 by a T-slot mounting mechanism 96 similar to mounting mechanism 352. The lower or free corner of the lever 92 has a stripper cam follower 98 in the form of a roller operatively engaged with a stripper cam 100 mounted on lower drive shaft 72.

Illustrated in FIG. 5 is a locating device mounted on the press bed 20 and the die block 52. The locating device comprises an L-shaped block 102 and a flat block 104 secured to the rear of the die block 52 by appropriate securing bolts 106 while blocks 108 with upstanding pins 110 are secured to the press bed 20 by bolts 112 (FIG. 4) whereby accurate and repeatable positioning of the die set 48 relative to the press bed 20 can be achieved when the locating elements are positioned as shown in FIG. 5.

Figure 9:
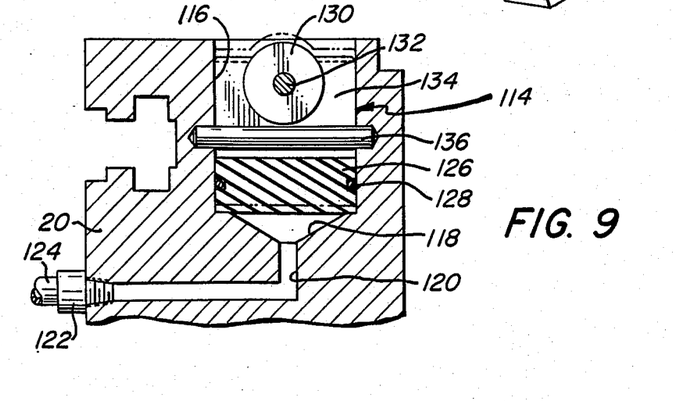
FIG. 9 is a detail sectional view of one of the pnuematic roller devices mounted in the press bed of the press.

In FIGS. 2 and 4, mounted in the press bed 20 are spaced-apart pneumatic roller devices each generally indicated by the numeral 114. As illustrated in FIG. 5, a total of four such devices 114 are mounted in the press bed 20 below the die block 52. Turning to FIG. 9, one of the pneumatic roller devices 114 is shown in greater detail. Formed in the press bed 20 is a recess 116 with a conical-shaped bottom 118 having a passageway 120 extending downwardly and outwardly therefrom through the vertical face of the press bed 20. Inserted in the passageway 120 is a nozzle 122 connected to hose 124 from a pressurized air source (not shown). Seated in the recess 116 is lift cylinder 126 with an O-ring seal 128 at the lower end thereof and a roller 130 mounted on a shaft 132 at the upper bifurcated portion 134 thereof. Extending through bifurcated portion 134 below the roller 130 is a dowel pin 136 press fit in the die bed 20. The pin 136 limits upward movement of the cylinder 126 to the position shown in phantom line in FIG. 9 when pressurized air is introduced from the pressurized air source through the passageway 120, nozzle 122 and hose 124 to the conical chamber formed by conical bottom 118. The cylinder 126 produces approximately seven hundred fifty (750) pounds of upward or lifting thrust when the desired amount of pressurization is introduced. The cylinder 126 will return to the position shown in solid line in FIG. 9 when the air pressure is released.

Figure 6:
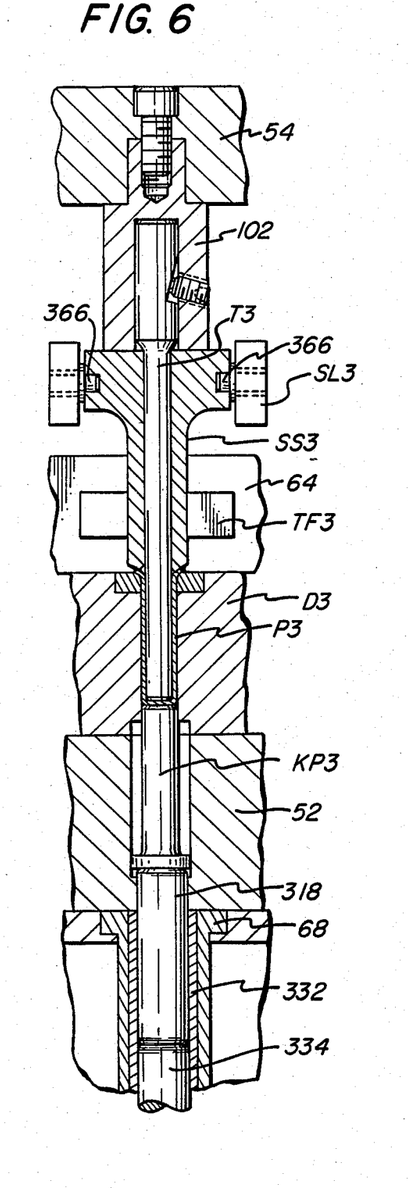
FIGS. 6 and 7 are views similar to FIG. 4, but on an enlarged scale and taken along a section-line normal thereto, showing the details of the tool station, FIG. 6 showing the closed position of the press and FIG. 7 showing the open (phantom line) and relieved (solid line) positions of the press.
Figure 7:
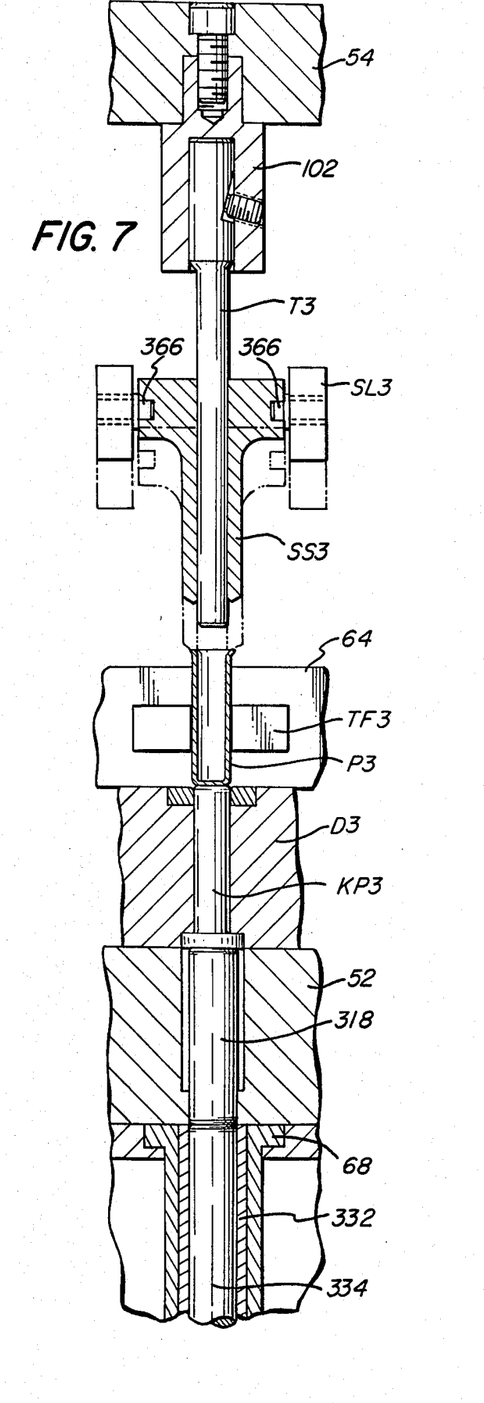

Turning now to FIGS. 6 and 7, the operation of the punch stripper mechanism 358 and punch stripping and stripper relief mechanism 78 at station 3 is illustrated. The lowermost or closed position of the machine is illustrated in FIG. 6 with the punching tool T3 engaging the part P3 and forming it in the die D3. The knockout plunger KP3, intermediate knockout pin 318 and knockout rod 334 are in their lowermost position forced downwardly by the punching tool T3 and part P3. The stripper sleeve 368 is engaged by punch holder 102 and cooperates with the punching tool T3 to form a lip portion on the part P3.

The knockout mechanism functions to provide positive upward movement of the part P3 after it has been worked upon to prevent the part P3 from being inadvertently jammed in the die D3 and move it upwardly to the level of and to be gripped by the transfer mechanism to move the part P3 to the next station. The stripper mechanism 358 serves to strip the part P3 from punching tool T3 as the ram moves upwardly after work has been done on the part. As shown in phantom line in FIG. 7, the stripper sleeve SS3 also positions and holds the part P3 in its uppermost position at a level whereby the transfer fingers TF3 of the transfer mechanism can grip the part for transfer to the next station. Following the engagement of the transfer fingers TF3 with the part P3, the relief mechanism (shown in FIG. 8) permits additional upward movement or relief of the stripper sleeve, as shown in solid line in FIG. 7, thereby creating a clearance between the part P3 and the stripper sleeve to allow unobstructed lateral movement of the part P3 to the next station. This relief movement is accomplished by timed action of the cams 100 acting on stripper levers SL2-SL5 through contacts C2-C5, removable bar 84, relief levers 82, actuating or push rods 88, triangular levers 92 and cam followers 98.

As previously indicated, it should be understood by those skilled in the art that the general part-forming operation of transfer press 10 of this invention is conventional; however, the new and novel features of this invention cooperate to facilitate removal of one die set and installation of a completely new die set in a relatively short period of time.

Figure 13:
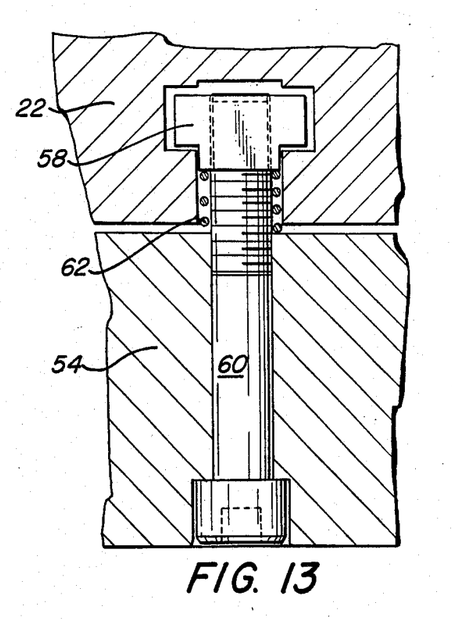

Referring now to FIG. 10, the removal operation of die set 48 is shown in greater detail. To replace a die set, auxiliary die set supports 47 are swung to their operative positions to support the die set 48 when it is pulled outwardly from the press bed 20 while the lubricating device 44 and hinged bracket 43 are swung out of the removal path for the die set to an inoperative position. The L-shaped block 67 is released from the ram 22 while the die set 48 is blocked in the open position by insertion of a suitable block member 104 which holds the die and punch blocks in a spaced apart relationship. It should be understood, in their final relaxed or press-opened positions, the knockout rods at the various stations and their associate pins (rod 334 and pin 318 for station 3 shown in FIG. 7) come to rest so that their ends are flush with the horizontal abutting surfaces of the die set 52 and the press bed 20. The securing bolts 60 (see FIGS. 5, 12 and 13) are loosened from within the die set to release the rigid connection between the T-shaped bars 58 on the die set 48 and the T-slots 56 in the press bed 20 and ram 22. The smallest T-bars 58 and their securing screws securing the rear of the die block 52 (FIG. 5) to the press bed 20 are removed. The ram 22 is hand wheeled upwardly to separate it slightly from the punch block 54, as shown in FIG. 13. Additionally, the friction locks (lock 322 shown for station 3 in FIG. 3) for retaining the intermediate knockout pins have been tightened so as to prevent interference with the removal operation and to prevent the knockout pins from dropping out of the die set 48 upon such removal. When the die set 48 is removed, the stripper mechanisms stay with the press 10 while the stripper sleeves SS2-SS5 are removed with the die set 48. However, it would be extremely difficult to remount a new die set with all its tooling if it was necessary to simultaneously align all the drive keys of the stripper levers SL2-SL5 with the stripper sleeves of the new die set. Therefore, stripper levers SL2-SL5 are disengaged from their position on pivot rod 76 as their half bearings permit them to be pulled upwardly and rearwardly by the operator prior to insertion of a new die set in the machine.

Furthermore, the bolts 86 and removable bar 84, which contains the preadjusted contact screws C2-C5, are removed. The bar 84 is kept with its associated die set leaving all the adjustments undisturbed. Finally, air is introduced to the pneumatic roller devices to elevate the die set 48 from the die bed 20. The die set 48 can then be pulled forwardly onto the rollers 45 of auxiliary die supports 47 and removed from the machine.

A new die set can be accurately inserted in the machine using the locating device (FIG. 5, elements 102-110). After the associated bolts for the new die set are tightened to secure the die set in place, the forks of the stripper levers SL2-SL5 are individually positioned around the new stripper sleeves thereof and dropped back on pivot rod 84 while a new removable bar with appropriate contact elements is positioned between the relief levers 82.

It should be noted that the knockout rods and their associated knockout mechanisms are left completely intact during the die set changeover process because the uppermost surfaces of the knockout rods are flush with the horizontal die supporting surface of the press bed whereby they do not interfere with the die set removal and insertion. This feature is an improvement over the conventional U.S. Baird press which requires complete disassembly of the knockout mechanisms to achieve die set changeover.

Thus, it can be seen from the foregoing specification and attached drawings that the transfer press of the present invention provide an effective means to utilize inexpensive commercially available die sets which can be quickly and easily interchanged to meet the need of the "just-in-time" concept of manufacturing.

The preferred embodiment described above admirably achieves the objects of the invention; however, it will be appreciated that departures can be made by those skilled in the art without departing from the spirit and scope of the invention which is limited only by the following claims.

Having thus described the invention, what is claimed is:

1. A multi-station metal forming press comprising:
   a press frame having a press bed with a substantially planar, horizontally orientated die set supporting surface, said press bed having a vertical slot therethrough;
   a single ram mounted on said frame for vertical reciprocation above said press bed;
   power drive means operationally connected to said ram to reciprocate said ram;
   a die set having a punch block secured to said ram and a die block secured to said press bed in a faceto-face relationship with said die set supporting surface, said die block having a plurality of apertures spaced along its longitudinal axis aligned with said slot of said press bed, each of said apertures having an intermediate knockout pin located therein, said die set including a plurality of guide post arrangements extending between said punch and die blocks;

a plurality of metal forming dies mounted on said die block, each of said dies having a centrally located work forming opening therein aligned with a selected one of said die block apertures, each of said openings having a knockout plunger located therein;

a plurality of metal forming punching tools mounted on said punch block and corresponding in number to said plurality of metal forming dies, each of said punching tools being aligned with and configured to enter into the centrally located work forming opening of its associated die, the associated pairs of dies and punches forming work stations spaced longitudinally within said die set;

transfer means mounted on said frame and extending within said die set for carrying a workpiece sequentially in a predetermined manner to each of said work stations; and a knockout mechanism having a plurality of knockout rods, each having upper and lower ends, mounted for longitudinal movement within said slot of said press bed, means positioning each of said knockout rods to a position where its upper end is normally flush with said horizontal surface of said press bed and into operative engagement with its associated intermediate knockout pin, each of said knockout rod and its associated intermediate knockout pin are separate elements, and means engaging said lower ends of said knockout rods for providing a periodic positive upward force on the same within said slot to move said knockout rods out of their normally flush position with said horizontal surface of said press bed;

whereby said die set, said dies and punching tools, said knockout plungers and intermediate knockout pins can be removed from said frame without interference from said knockout mechanism when said knockout rods have said upper ends thereof flush with said horizontal surface of said die bed.

2. The multi-station metal forming press in accordance with claim 1 wherein said die set further includes locking means for holding said intermediate knockout pins in said apertures and preventing relative movement between said intermediate knockout pins and said die set when said die set is removed from said frame.

3. The multi-station metal forming press in accordance with claim 2 wherein said locking means includes plurality friction devices with spring biased friction pins and adjustment screws.

4. The multi-station metal forming press in accordance with claim 1 further including an auxiliary support system adjacent said die set supporting surface to support said die set when it is being removed from and installed in the press.

5. The multi-station metal forming press in accordance with claim 4 wherein said auxiliary support system is adjustably attached to said press bed.

6. The multi-station metal forming press in accordance with claim 4 wherein said auxiliary support system is hingedly secured to said press bed.

7. The multi-station metal forming press in accordance with claim 1 wherein said die set has a plurality of connecting elements attached on upper and lower surfaces thereof and said press bed and ram have mating connecting means receiving said connecting elements of said die set.

8. The multi-station metal forming press in accordance with claim 7 wherein said connecting elements are T-shaped bars and said mating connecting means are T-shaped slots.

9. The multi-station metal forming press in accordance with claim 8 wherein said connecting elements have fasteners extending through said punch and die blocks whereby said T-shaped bars can be loosened and tightened from within said die set.

10. The multi-station metal forming press in accordance with claim 9 wherein biasing means surround said fasteners to bias said T-shaped bars from said die set.

11. The multi-station metal forming press in accordance with claim 1 further including means mounted in said press bed for elevating said die set to facilitate removal thereof.

12. The multi-station metal forming press in accordance with claim 11 wherein said elevating means are pneumatically actuated roller devices.

13. A multi-station metal forming press comprising:
a press frame having a press bed;
a single ram mounted on said frame for vertical reciprocation above said press bed;
power drive means operationally connected to said ram to reciprocate said ram;
a die set having a punch block secured to said ram and a die block secured to said press bed, said die set including a plurality of guide post arrangements extending between said punch and die blocks;
a plurality of metal forming dies mounted on said die block, each of said dies having a centrally located work forming opening therein;
a plurality of metal forming punching tools mounted on said punch block and corresponding in number to said plurality of metal forming dies, each of said punching tools being aligned with and configured to enter into the centrally located opening of its associated die; the associated pairs of dies and punches forming work stations spaced longitudinally within said die set;
transfer means mounted on said frame and extending within said die set for carrying workpieces sequentially in a predetermined manner to each of said work stations; and
a stripper mechanism having a stripper sleeve surrounding each of said punching tools and a plurality of stripper levers corresponding in number to the number of said stripper sleeves and operatively engaged therewith, said stripper levers being supported for pivotal movement adjacent said die set; and
stripper relief means mounted on said frame and having a removable bar carrying a plurality of adjustable contact elements operatively engageable with said stripper levers and means to move said removable bar in a timed relationship to the operation of said ram whereby said stripper relief means permits upward movement of said stripper sleeves to allow workpiece transfer by said transfer means.

14. The multi-station forming press in accordance with claim 13 wherein said means to move said removable bar has a pair of spaced apart stripper relief levers pivotally mounted above said stripper levers, said removable bar extends between said relief levers.

15. The multi-station metal forming press in accordance with claim 14 wherein said means to move said removable bar further including means to move said stripper relief levers and said removable bar thereon in a timed relationship to the operation of said ram.

16. The multi-station metal forming press in accordance with claim 13 wherein said stripper mechanism includes a pair of spaced apart brackets supporting a pivot rod therebetween.

17. The multi-station metal forming press in accordance with claim 13 wherein said stripper levers have half bearings which support said levers for pivotal movement adjacent said die set and facilitate removal of said levers during die set changeover.

18. The multi-station metal forming press in accordance with claim 13 wherein said stripper mechanism further includes biasing springs operatively connected to said stripper levers whereby said springs provide an upward force on said stripper sleeves through said stripper levers.

19. The multi-station metal forming press in accordance with claim 13 further including means mounted in said press bed for elevating said die set to facilitate removal thereof.

20. The multi-station metal forming press in accordance with claim 19 wherein said elevating means are pneumatically actuated roller devices.

21. A multi-station metal forming press comprising:
a press frame having a press bed with a substantially planar, horizontally orientated die set supporting surface, said press bed having a vertical slot therethrough;
a single ram mounted on said frame for vertical reciprocation above said press bed;
power drive means operationally connected to said ram to reciprocate said ram;
a die set having a punch block secured to said ram and a die block secured to said press bed in a face-to-face relationship with said die set supporting surface, said die block having a plurality of apertures spaced along its longitudinal axis aligned with said slot of said press bed, each of said apertures having an intermediate knockout pin located therein, said die set including a plurality of guide post arrangements extending between said punch and die blocks;
a plurality of metal forming dies mounted on said die block, each of said dies having a centrally located work forming opening therein aligned with a selected one of said die block apertures, each of said openings having a knockout plunger located therein;
a plurality of metal forming punching tools mounted on said punch block and corresponding in number to said plurality of metal forming dies, each of said punching tools being aligned with and configured to enter into the centrally located work forming opening of its associated die, the associated pairs of dies and punches forming work stations spaced longitudinally within said die set;
transfer means mounted on said frame and extending within said die set for carrying workpieces sequentially in a predetermined manner to each of said work stations;
a knockout mechanism having a plurality of knockout rods, each having upper and lower ends, mounted for longitudinal movement within said slot of said press bed, means positioning each of said knockout rods to a position where its upper end is normally flush with said horizontal surface of said press bed and into operative engagement with its associated intermediate knockout pin, each of said knockout rods and its associated intermediate knockout pin are separate elements, and means engaging said lower ends of said knockout rods for providing a periodic positive upward force on the same within said slot to move said knockout rods out of their normally flush position with said horizontal surface of said of said press bed;
a stripper mechanism having a stripper sleeve surrounding each of said punching tools and a plurality of stripper levers corresponding in number to the number of said stripper sleeves and operatively engaged therewith, said stripper levers being supported for pivotal movement adjacent said die set; and
stripper relief means mounted on said frame and having a removable bar carrying a plurality of adjustable contact elements operatively engageable with said stripper levers;
whereby said die set, said dies and punching tools, said knockout plungers and intermediate knockout pins can be removed from said frame without interference from said knockout mechanism when said knockout rods have said upper ends thereof flush with said horizontal surface of said die bed.

22. The multi-station metal forming press in accordance with claim 21 wherein said die set further includes locking means for holding said intermediate knockout pins in said apertures and preventing relative movement between said intermediate knockout pins and said die set when said die set is removed from said frame.

23. The multi-station metal forming press in accordance with claim 21 wherein said locking means includes plurality friction devices with spring biased friction pins and adjustment screws.

24. The multi-station metal forming press in accordance with claim 21 further including an auxiliary support system adjacent said die set supporting surface to support said die set when it is being removed from and installed in the press.

25. The multi-station metal forming press in accordance with claim 24 wherein said auxiliary support system is attached to said press bed.

26. The multi-station metal forming press in accordance with claim 25 wherein said auxiliary support system is hingedly secured to said press bed.

27. The multi-station metal forming press in accordance with claim 21 wherein said die set has a plurality of connecting elements attached on upper and lower surfaces thereof and said press bed and ram have mating connecting means receiving said connecting elements of said die set.

28. The multi-station metal forming press in accordance with claim 27 wherein said connecting elements are T-shaped bars and said mating connecting means are T-shaped slots.

29. The multi-station metal forming press in accordance with claim 28 wherein said connecting elements have fasteners extending through said punch and die blocks whereby said T-shaped bars can be loosened and tightened from within said die set.

30. The multi-station metal forming press in accordance with claim 29 wherein biasing means surround said fasteners to bias said T-shaped bars from said die set.

31. The multi-station forming press in accordance with claim 21 wherein said stripper relief means has a pair of spaced apart stripper relief levers pivotally mounted above said stripper levers, said removable bar extends between said relief levers.

32. The multi-station metal forming press in accordance with claim 31 wherein said stripper relief means further including means to move said stripper relief levers and said removable bar thereon in a timed relationship to the operation of said ram whereby said stripper relief means permits upward movement said stripper sleeves to allow workpiece transfer by said transfer means.

33. The multi-station metal forming press in accordance with claim 21 wherein said stripper mechanism includes a pair of spaced apart brackets supporting a pivot rod therebetween.

34. The multi-station metal forming press in accordance with claim 33 wherein said stripper levers have half bearings which support said levers for pivotal movement adjacent said die set and facilitate removal of said levers during die set changeover.

35. The multi-station metal forming press in accordance with claim 21 wherein said stripper mechanism further includes biasing springs operatively connected to said stripper levers whereby said springs provide an upward force on removable bar and said stripper sleeves through said stripper levers and a downward force on the half bearings.

36. The multi-station metal forming press in accordance with claim 21 further including means mounted in said press bed for elevating said die set to facilitate removal thereof.

37. The multi-station metal forming press in accordance with claim 36 wherein said elevating means are pneumatically actuated roller devices.

38. A multi-station metal forming press comprising:
a press frame having a press bed;
a single ram mounted on said frame for vertical reciprocation above said press bed;
power drive means operationally connected to said ram to reciprocate said ram;
a die set having having a punch block secured to said ram and a die block secured to said press bed, said die set including a plurality of guide post arrangements extending between said punch and die blocks;
a plurality of metal forming dies mounted on said die block; each of said dies having a centrally located work forming opening therein;
a plurality of metal forming punching tools mounted on said punch block and corresponding in number to said plurality of metal forming dies, each of said punching tools being aligned with and configured to enter into the centrally located opening of its associated die; the associated pairs of dies and punches forming work stations spaced longitudinally within said die set;
transfer means mounted on said frame and extending within said die set for carrying workpieces sequentially in a predetermined manner to each of said work stations; and
a stripper mechanism having a stripper sleeve surrounding each of said punching tools and a plurality of stripper levers corresponding in number to the number of said stripper sleeves and operatively engaged therewith, said stripper levers being supported for pivotal movement adjacent said die set; and
stripper relief means mounted on said frame and having a removable bar carrying a plurality of adjustable contact elements operatively engageable with said stripper levers and a pair of spaced apart stripper relief levers pivotally mounted above said stripper levers, said removable bar extends between said relief levers.

39. The multi-station metal forming press in accordance with claim 38 wherein said stripper relief means further including means to move said stripper relief levers and said removable bar thereon in a timed relationship to the operation of said ram whereby said stripper relief means permits upward movement said stripper sleeves to allow workpiece transfer by said transfer means.

40. A multi-station metal forming press comprising:
a press frame having a press bed;
a single ram mounted on said frame for vertical reciprocation above said press bed;
power drive means operationally connected to said ram to reciprocate said ram;
a die set having a punch block secured to said ram and a die block secured to said press bed, said die set including a plurality of guide post arrangements extending between said punch and die blocks;
a plurality of metal forming dies mounted on said die block; each of said dies having a centrally located work forming opening therein;
a plurality of metal forming punching tools mounted on said punch block and corresponding in number to said plurality of metal forming dies, each of said punching tools being aligned with and configured to enter into the centrally located opening of its associated die; the associated pairs of dies and punches forming work stations spaced longitudinally within said die set;
transfer means mounted on said frame and extending within said die set for carrying workpieces sequentially in a predetermined manner to each of said work stations; and
a stripper mechanism having a stripper sleeve surrounding each of said punching tools and a plurality of stripper levers corresponding in number to the number of said stripper sleeves and operatively engaged therewith, said stripper levers being supported for pivotal movement adjacent said die set; and
stripper relief means mounted on said frame and having a removable bar carrying a plurality of adjustable contact elements operatively engageable with said stripper levers, said stripper levers have half bearings which support said levers for pivotal movement adjacent said die set and facilitate removal of said levers during die set changeover.

* * * * *